United States Patent
Crawley et al.

(10) Patent No.: US 6,332,923 B1
(45) Date of Patent: Dec. 25, 2001

(54) LIQUID SPRAY SYSTEM FOR DEPOSITING COATINGS ON SUBSTRATES

(75) Inventors: Richard Lee Crawley, Ann Arbor, MI (US); Daryl Middleton, Tulsa; James Arthur Davis, Broken Arrow, both of OK (US); Kanwal Bhatia, Troy; Robert Franklin Tweadey, Farmington Hills, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/498,849

(22) Filed: Feb. 7, 2000

(51) Int. Cl.[7] ................................. B05C 5/00; B05B 3/00
(52) U.S. Cl. ............................................ 118/302; 118/323
(58) Field of Search ...................... 118/300, 302, 118/303, 305, 323; 239/115, 284.1, 290

(56) References Cited

U.S. PATENT DOCUMENTS

| | | |
|---|---|---|
| 3,902,669 * | 9/1975 | Keibler ................................. 239/227 |
| 3,977,609 * | 8/1976 | Gallant ............................... 239/417.3 |
| 4,243,449 * | 1/1981 | Swartz .................................... 156/82 |
| 4,300,723 | 11/1981 | Prasthofer . |
| 4,527,510 * | 7/1985 | Arndt .................................... 118/669 |
| 4,562,676 | 1/1986 | Kruschwitz . |
| 4,627,145 | 12/1986 | Niemanns . |
| 4,655,810 | 4/1987 | Van Cauter et al. . |
| 4,894,972 | 1/1990 | Endoh et al. . |
| 4,994,315 | 2/1991 | Schreiber et al. . |
| 5,062,248 | 11/1991 | Kunert . |
| 5,085,021 | 2/1992 | Kunert . |
| 5,137,770 | 8/1992 | Rothe et al. . |
| 5,217,168 | 6/1993 | Svendsen . |
| 5,413,397 | 5/1995 | Gold . |
| 5,478,132 | 12/1995 | Gold . |
| 5,544,458 | 8/1996 | Allison et al. . |
| 5,620,648 | 4/1997 | Volkmann et al. . |
| 5,800,867 * | 9/1998 | Matsunaga et al. ................. 427/236 |
| 5,916,393 * | 6/1999 | Shaffer et al. .......................... 156/82 |

* cited by examiner

*Primary Examiner*—Laura Edwards
*Assistant Examiner*—Yewebdar T. Tadesse
(74) *Attorney, Agent, or Firm*—John E. Kajander

(57) ABSTRACT

A liquid spray for depositing a coating on a surface of a substrate includes a support bracket and a liquid atomizer operatively connected to the support bracket to spray a liquid spray system also includes an auxiliary air nozzle operatively connected to the support bracket to spray a stream of air to meet the liquid spray just above the surface of the substrate. The support bracket is positioned at a predetermined angle relative to the surface of the substrate for depositing a liquid spray coating on the surface of the substrate.

20 Claims, 1 Drawing Sheet

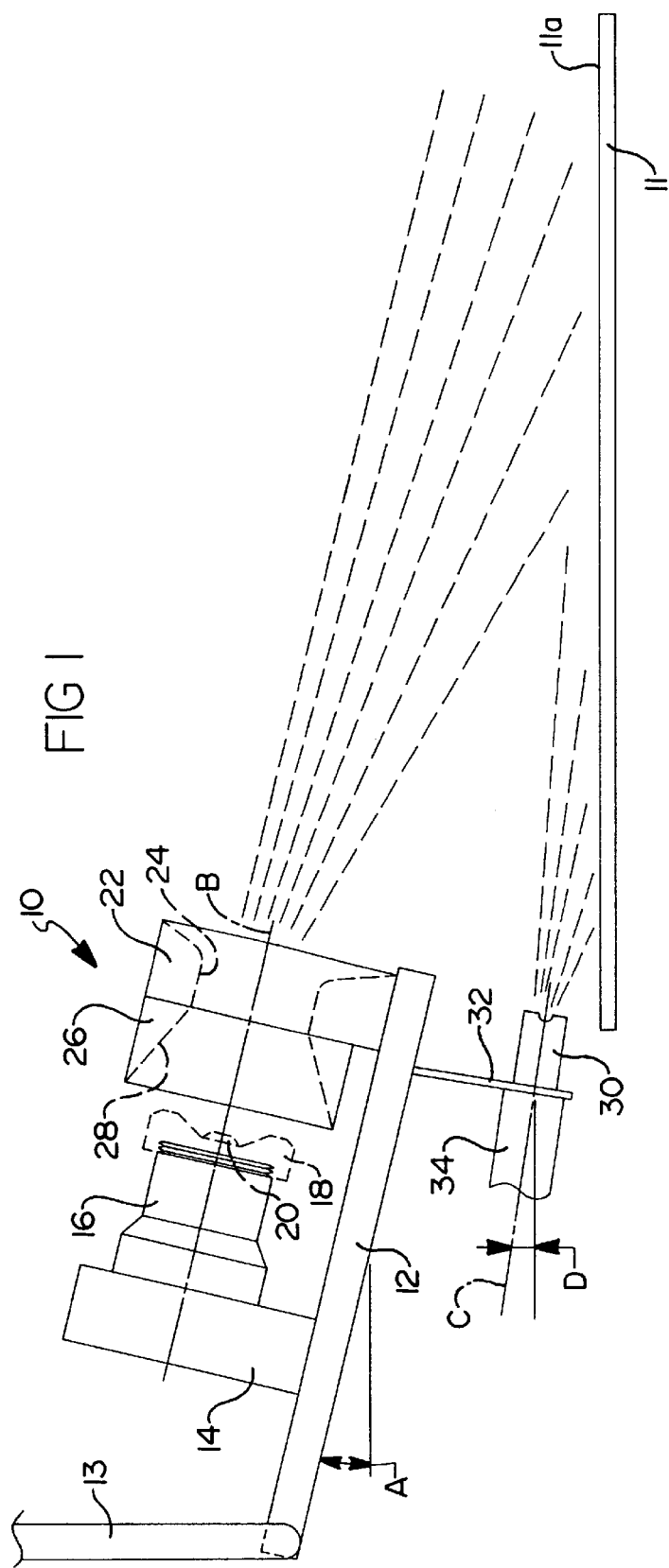

LIQUID SPRAY SYSTEM FOR DEPOSITING COATINGS ON SUBSTRATES

BACKGROUND OF THE INVENTION

1. Field of the Invention

The present invention relates generally to substrates such as glass panels and, more specifically, to a liquid spray system for depositing coatings on substrates such as glass panels for architectural or vehicle applications.

2. Description of the Related Art

It is known to coat a substrate such as a glass panel using an air atomized spray nozzle to transmit a liquid precursor solution to a surface of the substrate. In particular, it is known to use pyrolytic spray deposition of organometallic compounds onto float glass as it emerges from a furnace float tank. During this process, a standard spray gun nozzle is positioned perpendicular to the surface of the substrate, resulting in overspray buildup on the spray gun nozzle which can then drop off, causing defects on the coated substrate. However, when the spray gun nozzle is angled with respect to the surface of the substrate, the spray head remains clean. The spray gun nozzle is traversed across the substrate. However, in this configuration, it is difficult to obtain good coating uniformity due to a heel region of a spray pattern footprint on the substrate; that is, the higher deposition region nearest to the spray gun nozzle. As a result, attempts have been made to use multiple spray gun nozzles which is undesired.

Although the above spray process has worked, it is desirable to more uniformly randomize the spray pattern near the surface of the substrate in order to produce a more uniform coating. It is also desirable to prevent buildup on the standard spray gun nozzle. It is further desirable to use one standard spray gun nozzle to coat the surface of a substrate.

SUMMARY OF THE INVENTION

Accordingly, the present invention is a liquid spray system for depositing a coating on a surface of a substrate includes a support bracket and a liquid atomizer operatively connected to the support bracket to spray a liquid spray. The liquid spray system also includes an auxiliary air nozzle operatively connected to the support bracket to spray a stream of air to meet the liquid spray just above the surface of the substrate. The support bracket is positioned at a predetermined angle relative to the surface of the substrate for depositing a liquid spray coating on the surface of the substrate.

One advantage of the present invention is that a liquid spray system is provided for depositing pyrolytic coatings on large substrates such as architectural glass panels. Another advantage of the present invention is that the liquid spray system uses additional air sources in conjunction with a standard spray gun nozzle. Yet another advantage of the present invention is that the liquid spray system allows the use of one standard spray gun nozzle which stays clean and produces no heel on the substrate. dramatically improves both the efficiency of the spray process, the uniformity of the resultant coating and prevents build-up on spray system parts.

Other features and advantages of the present invention will be readily appreciated, as the same becomes better understood after reading the subsequent description when taken in conjunction with the accompanying drawings.

BRIEF DESCRIPTION OF THE DRAWINGS

FIG. 1 is an elevational view of a liquid spray system, according to the present invention, for depositing pyrolytic coatings on substrates.

DESCRIPTION OF THE PREFERRED EMBODIMENT(S)

Referring now to the drawings and in particular FIG. 1, one embodiment of a liquid spray system 10, according to the present invention, is shown for depositing a coating on a substrate 11. The substrate 11 has a surface 11*a* to be coated by the coating such as a pyrolytic coating. Preferably, the substrate 11 is a relatively large substrate such as architectural glass panels or perhaps for a windshield (not shown) of a vehicle (not shown). It should be appreciated that the coating may be any suitable coating for the substrate 11.

The liquid spray system 10 includes a support bracket 12 extending longitudinally and connected to a support surface (not shown) by suitable means such as a support member 13. The support bracket 12 is supported and orientated at an angle A of approximately ten to twenty degrees to the surface 11*a* of the substrate 11. The support bracket 12 is generally rectangular in shape and made of a metal material.

The liquid spray system 10 also includes a spray head bracket 14 extending upwardly and generally perpendicularly to the support bracket 12. The spray head bracket 14 is generally rectangular in shape and made of a metal material. The liquid spray system 10 includes an external-air spray or liquid atomizer 16 mounted on the spray head bracket 14 by suitable means such as fasteners (not shown). The liquid atomizer 16 has a separate aircap 18 and a liquid nozzle 20 connected thereto. It should be appreciated that the liquid atomizer 16 is conventional, commercially available and known in the art.

The liquid spray system 10 also includes a front transvector 22 extending upwardly and generally perpendicularly to the support bracket 12. The front transvector 22 is generally externally rectangular in shape and has a circular aperture 24 extending axially therethrough. The front transvector 22 is made of a metal material. The front transvector 22 includes an entrance cone 26 extending toward the liquid atomizer 16. The entrance cone 26 is generally circular in shape and has a throat or funnel shaped portion 28 extending axially therethrough. The entrance cone 26 is positioned a predetermined distance such as approximately 0.2 inches to approximately 0.8 inches measured from an exit plane of the liquid nozzle 20 of the liquid atomizer 16 to an entrance plane of the entrance cone 26 of the front transvector 22, which is also known as an air amplifier. The front transvector 22 has a centerline or longitudinal axis B extending therethrough. The exit plane of the front transvector 22 is located close to the exit of the throat 28 of the entrance cone 26 and has a rounded (fillet) cross-section at the exit plane. The front of the centerline B is located a predetermined distance such as approximately four to approximately five inches above the surface 11*a* of the substrate 11. It should be appreciated that the liquid spray system 10 is traversed across the substrate 11 such as a hot ribbon of glass twelve (12) feet in width at speeds of up to one hundred sixty-eight (168) inches per second (i.e., spray bracket 12 traverse is perpendicular to the spray direction).

The liquid spray system 10 also includes an auxiliary air nozzle 30 disposed directly below the front transvector 22 and mounted to the support bracket 12 by suitable means such as a bracket 32. The air nozzle 30 is connected by suitable means such as a hose 34 to a source of air (not shown). The air nozzle 30 exhausts air parallel to the transvector/liquid spray in the plane parallel to the surface 11*a* of the substrate 11. The air nozzle 30 has a centerline or longitudinal axis C orientated at an angle D of approximately six (6) to sixteen (16) degrees to the surface 11a of the substrate 11. The angle D of the air nozzle 30 perpendicular to the plane of the substrate 11 is adjusted so that the auxiliary air stream and the liquid spray meet at a point just above the surface 11a to be coated.

In operation of the liquid spray system 10, the liquid spray nozzle 20 and aircap 18 are adjusted to provide a roughly circular spray pattern aimed directly into the throat 28 of the front transvector 22. Preferably, a 0.042 inch liquid spray nozzle 20 is used to eject fluid at up to twelve (12) gallons per hour (gph) and a type 64 aircap 18 is used to atomize the fluid with twenty (20) to twenty-five (25) cubic feet per minute (cfm) of airflow to eliminate buildup on the front transvector 22. The entrance cone 26 shapes the spray pattern, focussing and accelerating the spray in the throat 28 and aperture 24 of the front transvector 22 to the substrate 11. The entrance cone 26 and front transvector 22 also add additional oxygen for the pyrolytic reaction, which occurs near the surface 11a of the substrate 11. Preferably, the aperture 24 has a diameter of approximately two inches. The front transvector 22 is shimmed from 0.10 to 0.15 inches and operates at an airflow rate from forty (40) to eighty (80) scfm, allowing up to twelve (12) gph of organometallic liquid spray to be pyrolyzed onto the hot surface 11a of the substrate 11. The auxiliary air nozzle 30 uses an airflow of forty (40) to eighty (80) scfm to mix with the liquid spray at a point just above the surface 11a of the substrate 11. As a result, the liquid spray system 10 produces a coating on the surface 11a of the substrate 11 with uniform consistency and relatively high efficiency, and relatively defect free.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A liquid spray system for depositing a coating on a surface of a substrate comprising:
   a support bracket;
   a single liquid atomizer operatively connected to said support bracket to spray a liquid spray; and
   an auxiliary air nozzle operatively connected to said support bracket to spray a stream of air to meet the liquid spray just above the surface of the substrate, wherein said support bracket is positioned at a predetermined angle relative to the surface of the substrate and traversed across the surface of the substrate for depositing a liquid spray coating on the surface of the substrate.

2. A liquid spray system for depositing a coating on a surface of a substrate comprising:
   a support bracket;
   a liquid atomizer operatively connected to said support bracket to spray a liquid spray;
   an auxiliary air nozzle operatively connected to said support bracket to spray a stream of air to meet the liquid spray just above the surface of the substrate, wherein said support bracket is positioned at a predetermined angle relative to the surface of the substrate for depositing a liquid spray coating on the surface of the substrate; and
   a front transvector mounted to said support bracket and positioned in front of said liquid atomizer.

3. A liquid spray system as set forth in claim 2 wherein said front transvector has an aperture extending therethrough to receive and guide the liquid spray.

4. A liquid spray system as set forth in claim 3 wherein said front transvector includes an entrance cone extending rearwardly therefrom and positioned a predetermined distance from said liquid atomizer.

5. A liquid spray system as set forth in claim 4 wherein said entrance cone has a throat extending therethrough and communicating with said aperture.

6. A liquid spray system as set forth in claim 5 wherein said throat has a funnel shape and said aperture has a rounded exit end.

7. A liquid spray system as set forth in claim 1 wherein said liquid atomizer comprises a liquid nozzle and an aircap.

8. A liquid spray system as set forth in claim 1 including a spray head bracket extending above and connected to said support bracket and connected to said liquid atomizer.

9. A liquid spray system as set forth in claim 1 including a bracket extending below and connected to said support bracket and connected to said auxiliary air nozzle.

10. A liquid spray system as set forth in claim 1 wherein said predetermined angle is ten to twenty degrees.

11. A liquid spray system for depositing a coating on a surface of a substrate comprising:
    a support bracket;
    a liquid atomizer operatively connected to said support bracket to spray a liquid spray;
    a front transvector mounted to said support bracket and positioned in front of said liquid atomizer and having an aperture extending therethrough to receive and guide the liquid spray; and
    an auxiliary air nozzle operatively connected to said support bracket to spray a stream of air to meet the liquid spray just above the surface of the substrate, wherein said support bracket is positioned at a predetermined angle relative to the surface of the substrate for depositing a liquid spray coating on the surface of the substrate.

12. A liquid spray system as set forth in claim 11 wherein said front transvector includes an entrance cone extending rearwardly therefrom and positioned a predetermined distance from said liquid atomizer.

13. A liquid spray system as set forth in claim 12 wherein said entrance cone has a throat extending therethrough and communicating with said aperture.

14. A liquid spray system as set forth in claim 11 wherein said liquid atomizer comprises a liquid nozzle and an aircap.

15. A liquid spray system as set forth in claim 11 including a spray head bracket extending above and connected to said support bracket and connected to said liquid atomizer and a bracket extending below and connected to said support bracket and connected to said auxiliary air nozzle.

16. A liquid spray system as set forth in claim 11 wherein said predetermined angle is ten to twenty degrees.

17. A liquid spray system as set forth in claim 12 wherein said predetermined distance is 0.2 inches to 0.8 inches.

18. A liquid spray system for depositing a coating on a surface of a substrate comprising:
    a support bracket;
    a liquid atomizer operatively positioned above and connected to said support bracket to spray a liquid spray;
    a front transvector mounted to said support bracket and positioned in front of said liquid atomizer and having an aperture extending therethrough to receive and guide the liquid spray;

an entrance cone extending rearwardly from said front transvector and positioned a predetermined distance from said liquid atomizer, said entrance cone having a throat extending therethrough and communicating with said aperture, said aperture having a rounded exit end; and an auxiliary air nozzle operatively positioned below and connected to said support bracket to spray a stream of air to meet the liquid spray just above the surface of the substrate, wherein said support bracket is positioned at a predetermined angle relative to the surface of the substrate for depositing a liquid spray coating on the surface of the substrate.

19. A liquid spray system as set forth in claim 18 wherein said predetermined angle is ten to twenty degrees.

20. A liquid spray system as set forth in claim 18 wherein said predetermined distance is 0.2 inches to 0.8 inches.

* * * * *